United States Patent
Choi et al.

(10) Patent No.: US 12,206,286 B2
(45) Date of Patent: Jan. 21, 2025

(54) ROTOR FOR INDUCTION MOTOR AND INDUCTION MOTOR USING SAME

(71) Applicants: HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

(72) Inventors: Jin Ho Choi, Suwon-si (KR); Sang Jin Park, Hwaseong-si (KR); Jong Seok Lee, Suwon-si (KR); Ki O Kim, Hwaseong-si (KR); Sung Woo Hwang, Seoul (KR); Myung Seop Lim, Seoul (KR); Jae Hyun Kim, Seoul (KR)

(73) Assignees: HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 259 days.

(21) Appl. No.: 17/858,393

(22) Filed: Jul. 6, 2022

(65) Prior Publication Data

US 2023/0132331 A1  Apr. 27, 2023

(30) Foreign Application Priority Data

Oct. 26, 2021  (KR) .................. 10-2021-0143719

(51) Int. Cl.
*H02K 1/26* (2006.01)
*H02K 1/28* (2006.01)
*H02K 7/00* (2006.01)

(52) U.S. Cl.
CPC ............... *H02K 1/265* (2013.01); *H02K 1/28* (2013.01); *H02K 7/003* (2013.01)

(58) Field of Classification Search
CPC .......... H02K 1/265; H02K 1/28; H02K 15/12; H02K 17/16; H02K 17/165; H02K 17/18;
(Continued)

(56) References Cited

U.S. PATENT DOCUMENTS

| | | | |
|---|---|---|---|
| 2008/0191578 A1* | 8/2008 | Evans ................... | H02K 1/148 310/216.012 |
| 2013/0093282 A1* | 4/2013 | Wang ................. | H02K 15/0012 310/211 |

(Continued)

FOREIGN PATENT DOCUMENTS

KR  20200099881 A  *  8/2020

OTHER PUBLICATIONS

Kim, "Rotor for Induction Motor and Manufacturing Method Thereof, Induction Motor", (2020), English Machine Translation (Year: 2020).*

*Primary Examiner* — Terrance L Kenerly
*Assistant Examiner* — Theodore L Perkins
(74) *Attorney, Agent, or Firm* — MCDONNELL BOEHNEN HULBERT & BERGHOFF LLP

(57) ABSTRACT

A rotor for an induction motor includes a rotor core having a hollow portion on a central portion wherein a shaft is coupled to the rotor core by being inserted through the hollow portion, a plurality of slots radially formed in the rotor core around a central axis of the shaft, a plurality of conductor bars coupled to the plurality of slots, and an end ring electrically connecting the plurality of conductor bars to each other, wherein the rotor core is thermally treated above Curie temperature to form a predetermined pattern on an outer circumference of the rotor core.

10 Claims, 5 Drawing Sheets

(58) Field of Classification Search
CPC ........ H02K 17/20; H02K 15/02; H02K 15/03; H02K 1/02; H02K 7/003
USPC ........................................................ 310/211
See application file for complete search history.

(56) References Cited

U.S. PATENT DOCUMENTS

| | | | |
|---|---|---|---|
| 2016/0164387 A1* | 6/2016 | Komatsu | H02K 17/165 |
| | | | 29/598 |
| 2019/0312473 A1* | 10/2019 | Ikuta | H02K 11/215 |
| 2020/0177039 A1* | 6/2020 | Torrey | H02K 1/2773 |

* cited by examiner

ROTOR FOR INDUCTION MOTOR AND INDUCTION MOTOR USING SAME

CROSS REFERENCE TO RELATED APPLICATIONS

This application claims priority to Korean Patent Application No. 10-2021-0143719, filed on Oct. 26, 2021, which is hereby incorporated by reference for all purposes as if fully set forth herein.

TECHNICAL FIELD

The present disclosure relates to a rotor for an induction motor and an induction motor using the same.

BACKGROUND

The following description simply provides background information on the present disclosure, and does not constitute the prior art.

As vehicle electrification is emerging as a major issue in the automobile industry, a demand for rare earth-free electric motors is increasing. Particularly, an induction motor is receiving attention as the rare-earth motor for replacing permanent magnet synchronous motors (PMSM). Accordingly, research on improving the performance of the induction motor is actively being conducted.

The induction motor mainly includes a stator and a rotor. The rotor is rotated using a rotating field generated by stator winding and an induction current generated by the rotating field.

A conventional rotor is formed by manufacturing a rotor core by stacking a plurality of circular steel sheets, and coupling a plurality of conductor bars to a plurality of slots formed inwards from the outer circumference of the rotor core. In this case, the plurality of conductor bars may be coupled to the rotor core using a die casting operation.

Meanwhile, in order to minimize noise and vibration of a conventional induction motor and to reduce harmonics and torque ripple, it is preferable that the rotor be manufactured in a skew shape. When considering a method of manufacturing the conductor bar and the rotor core, this skew type of rotor leads to an increase in process cost and process time.

Furthermore, when the slot formed in the conventional rotor core is of an open type, the difficulty of die casting of the conductor bar increases. If the rpm of the induction motor increases, the separation possibility of the conductor bar due to a centrifugal force increases.

If the slot in the rotor core is formed in a closed type, the difficulty of die casting the conductor bar may be lowered. However, an average torque decreases due to an increase in the leakage flux of the rotor. Therefore, there is a need for a rotor that can be manufactured using a manufacturing method that is different from an existing manufacturing method while having the advantages of the existing skew type rotor.

SUMMARY

In view of the above, the present disclosure provides a rotor for an induction motor and an induction motor using the same, in which heat treatment is applied to the rotor manufactured by a simple process to reduce leakage flux and torque ripple while saving process cost and process time.

According to at least one embodiment, the present disclosure provides a rotor for an induction motor, the rotor comprising a rotor core having a hollow portion on a central portion, and a shaft coupled to the rotor core by being inserted through the hollow portion, a plurality of slots radially formed in the rotor core around a central axis of the shaft, a plurality of conductor bars coupled to the plurality of slots, and an end ring electrically connecting the plurality of conductor bars to each other, wherein the rotor core is thermally treated above Curie temperature to form a predetermined pattern on an outer circumference of the rotor core.

Another embodiment of the present disclosure provides an induction motor comprising a rotor comprising a rotor core having a hollow portion on a central portion, and a shaft coupled to the rotor core by being inserted through the hollow portion, a plurality of slots radially formed around a central axis of the shaft in the rotor core, a plurality of conductor bars coupled to the plurality of slots, and an end ring electrically connecting the plurality of conductor bars to each other, a stator spaced apart from an outer circumference of the rotor core and disposed to face a circumference of the rotor core, and a winding coil wound around the stator, wherein the rotor core is thermally treated above Curie temperature to form a predetermined pattern on the outer circumference of the rotor core.

As described above, this embodiment is advantageous in that heat treatment is applied to the rotor manufactured by a simple process to reduce leakage flux and torque ripple while saving process cost and process time.

DETAILED DESCRIPTION

Figure 1:
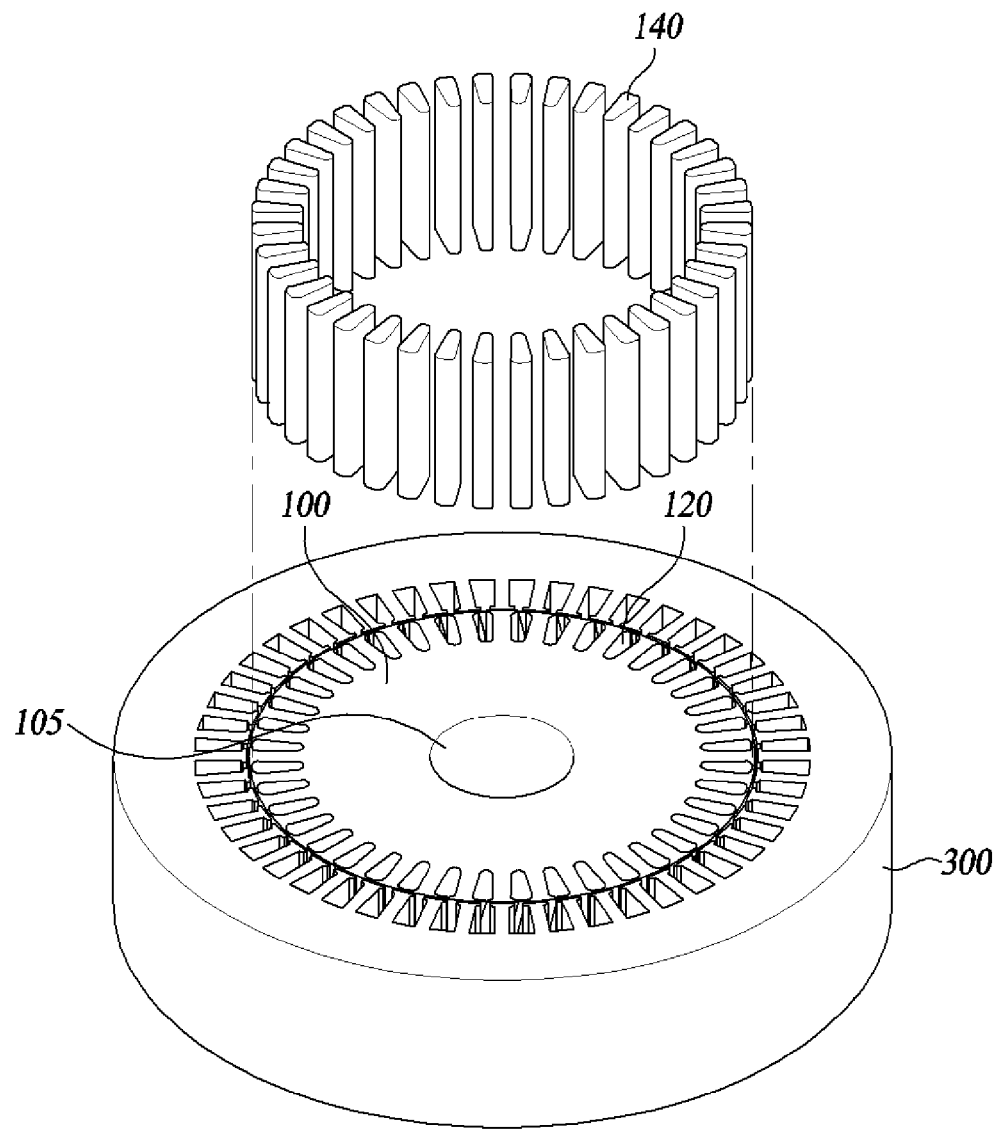
FIG. 1 is an exploded perspective view illustrating some components of a rotor for an induction motor according to an embodiment of the present disclosure.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is an exploded perspective view illustrating some components of a rotor for an induction motor according to an embodiment of the present disclosure.

Referring to FIG. 1, the rotor for the induction motor according to an embodiment of the present disclosure includes all or some of a rotor core 100, a plurality of slots 120, a plurality of conductor bars 140, and an end ring (not shown).

The rotor core 100 has, on a central portion thereof, a hollow portion 105 through which a shaft (not shown) may pass through to be coupled to the rotor core. The shaft is configured to rotate along with the rotor core 100 as the rotor core rotates. The shaft serves as a medium which transmits the rotating force of the rotor core 100 to a predetermined device.

The rotor core 100 may be formed by stacking a plurality of electrical steel sheets, but may be integrally manufactured without being necessarily limited thereto. Further, the rotor core 100 may have an overall cylindrical shape as shown in FIG. 1, but is not necessarily limited thereto.

Furthermore, the rotor core 100 according to an embodiment of the present disclosure is made of a ferromagnetic body, and is preferably a bi-state material which loses magnetism when heated to a temperature higher than or equal to the Curie temperature.

The plurality of slots 120 are radially formed around a central axis of the shaft in the rotor core 100. The cross-sections of the plurality of slots 120 may be formed to correspond to the cross-sections of the plurality of conductor bars 140, so that the plurality of conductor bars 140 may be coupled to the plurality of slots 120. The number of the plurality of slots 120 is not particularly limited thereto. However, the plurality of slots 120 may be formed to be spaced apart from each other by a predetermined interval.

The plurality of conductor bars 140 are conductors coupled to the plurality of slots 120. Thus, a plurality of conductor bars 140 may be made of copper (Cu), aluminum (Al), or the like, but is not necessarily limited thereto. The plurality of conductor bars 140 may be coupled to the plurality of slots 120 using a die casting method.

The number of the plurality of conductor bars 140 is preferably configured to be the same as that of the plurality of slots 120. Even in this case, the plurality of conductor bars 140 may be formed to be spaced apart from each other by a predetermined interval, but is not necessarily limited thereto.

Furthermore, the plurality of conductor bars 140 may be coupled to the plurality of slots 120 in a direction parallel to the shaft, but may be disposed to have a skew structure in the rotor core 100, thus preventing the occurrence of harmonics and reducing the torque ripple. However, the plurality of conductor bars 140 do not necessarily have the skew structure, and may be disposed in a direction parallel to the shaft.

Meanwhile, the plurality of slots 120 according to an embodiment of the present disclosure are formed on an inner portion of the rotor core 100, and is not formed on the outer circumference of the rotor core 100. Therefore, the plurality of conductor bars 140 may also be formed in the rotor core 100.

In the case when the plurality of slots are disposed on the outer circumference of the rotor core, it is difficult to apply the die-casting method for coupling between the plurality of conductor bars and the plurality of slots. Since the plurality of slots 120 according to an embodiment of the present disclosure are formed on the inner portion of the rotor core, the plurality of slots 120 and the plurality of conductor bars 140 may be coupled to each other through a simple process.

Furthermore, since the plurality of slots 120 are formed on the inner portion of the rotor core, the plurality of conductor bars 140 may not be removed from the rotor core 100 even when the induction motor rotates at a high speed or is severely vibrated.

The end ring electrically connects the plurality of conductor bars 140 to each other. Thus, the end ring may be configured in the form of a ring at both ends of the plurality of conductor bars 140.

Meanwhile, the induction motor using the rotor according to an embodiment of the present disclosure further includes a stator 300 (see FIG. 3) disposed on the outer circumference of the rotor core 100 to face the outer circumference. If a current is applied to a coil wound around the stator 300, a rotating field is formed, and the rotating field generates an induced current in the plurality of conductor bars 140. The rotor core 100 is rotated by the induced current generated in the plurality of conductor bars 140.

Figure 2A:
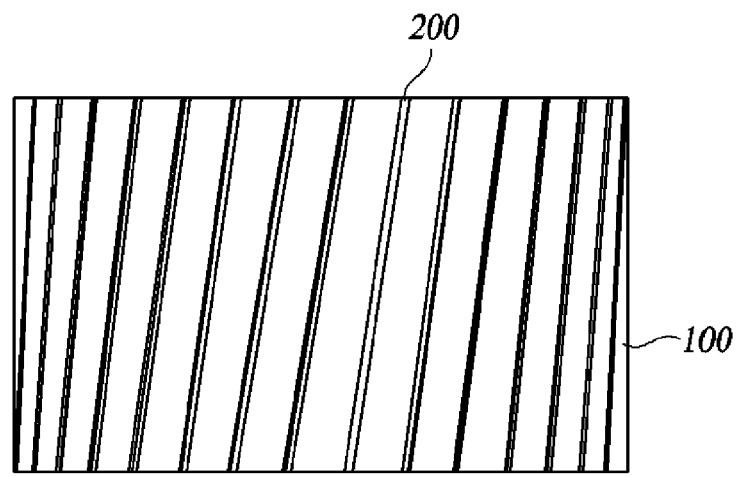
FIGS. 2A, 2B, and 2C are diagrams illustrating a heat treatment pattern applied to the rotor for the induction motor according to an embodiment of the present disclosure.
Figure 2B:
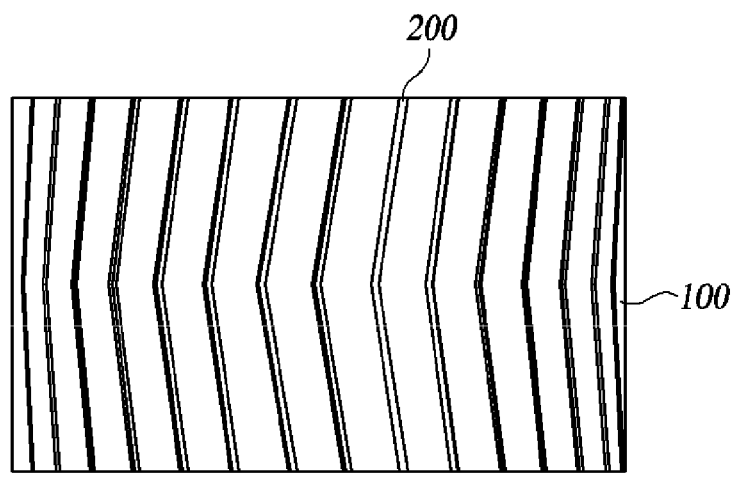
Figure 2C:
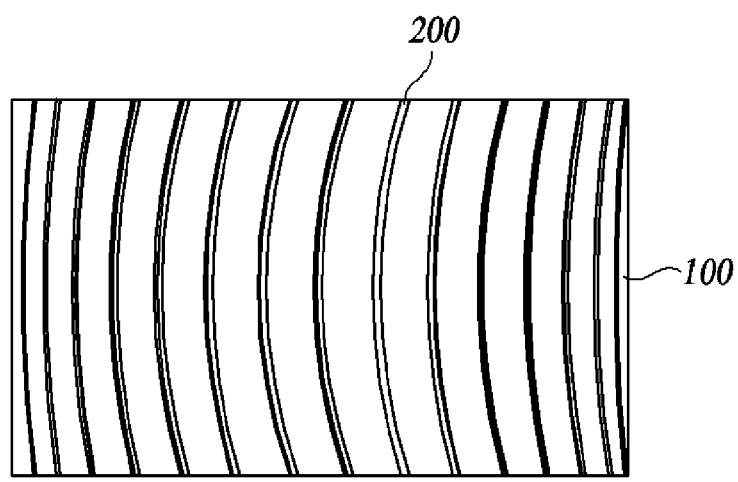

FIGS. 2A, 2B, and 2C are diagrams illustrating a heat treatment pattern applied to the rotor for the induction motor according to an embodiment of the present disclosure.

Referring to FIGS. 2A, 2B and 2C, the rotor core 100 according to an embodiment of the present disclosure may be thermally treated above the Curie temperature to form a predetermined pattern on the outer circumference of the rotor core 100. The heat treatment may be performed using a laser, but is not limited thereto.

When the rotor core 100 is made of a bi-state material, a portion which is thermally treated above the Curie temperature loses magnetism, so that the magnetic permeability of that portion may be lowered. For instance, the magnetic permeability of the portion which is thermally treated may be ⅒ or less of the magnetic permeability of a portion which is not thermally treated.

Hereinafter, a portion in which a predetermined pattern is formed by applying the heat treatment to the outer circumference of the rotor core 100 will be defined and described as a heat treatment portion 200.

Referring to FIG. 2A, heat treatment portions 200 may be formed side by side on the outer circumference of the rotor core 100 according to an embodiment of the present disclosure in a direction which is not parallel to the central axis of the shaft. For instance, when the plurality of conductor bars 140 are disposed in the rotor core 100 to have a skew structure, the heat treatment portions 200 may be formed side by side in the longitudinal direction of the plurality of conductor bars 140, but are not necessarily limited thereto.

In other words, even when the conductor bars 140 are disposed side by side in a direction parallel to the central axis of the shaft, the heat treatment portions 200 may be formed side by side in a direction which is not parallel to the central axis of the shaft. Further, when the conductor bars 140 are disposed side by side in a direction parallel to the central axis of the shaft, the heat treatment portions 200 may be formed in a direction parallel to the central axis of the shaft, i.e. the longitudinal direction of the conductor bars 140.

Referring to FIGS. 2B and 2C, the heat treatment portions 200 may be formed side by side in the shape of 'V' or 'U' to extend from one end to the other end of the outer circumference of the rotor core 100. In this case, the heat treatment portions 200 may be formed regardless of the longitudinal direction of the plurality of conductor bars 140.

Meanwhile, although not shown in FIG. 2, the width of the heat treatment portion 200 may be configured to vary in the longitudinal direction. Furthermore, in FIG. 2, the heat treatment portion 200 is shown to have a straight-line shape, a 'V' shape, or a 'U' shape, but this is merely illustrative. In addition, various shapes are possible to improve the performance of the induction motor.

Figure 3:
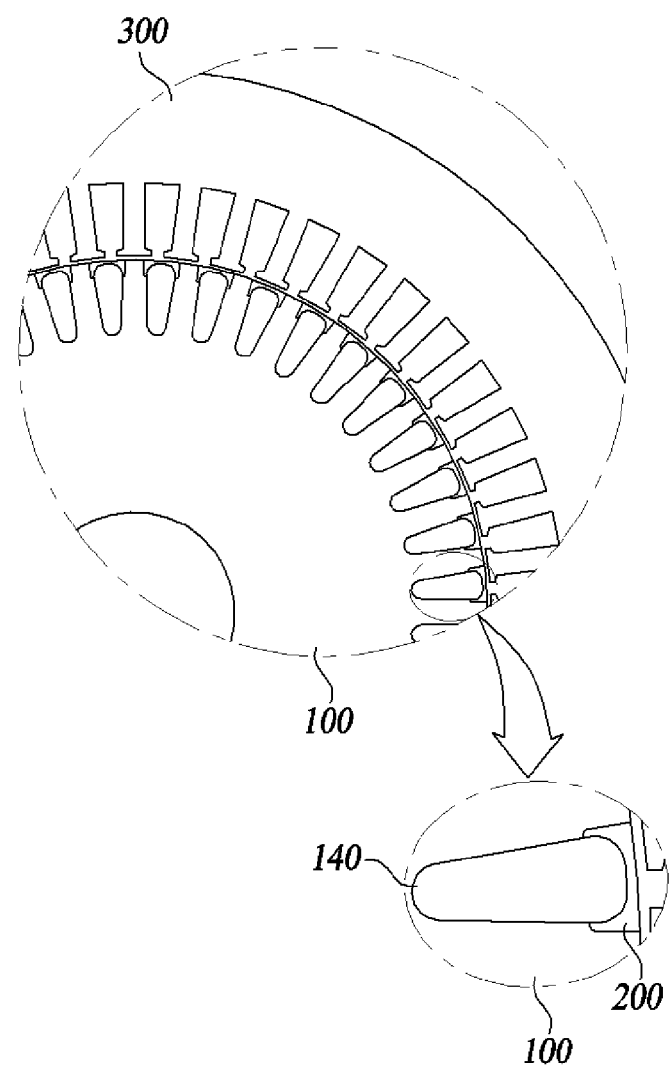
FIG. 3 illustrates an induction motor using a rotor for an induction motor according to an embodiment of the present disclosure, in a partial sectional view and an enlarged view.

FIG. 3 illustrates an induction motor using a rotor for an induction motor according to an embodiment of the present disclosure, in a partial sectional view and an enlarged view.

Referring to FIG. 3, the induction motor using the rotor for the induction motor according to an embodiment of the present disclosure may include the stator 300 which is disposed to be spaced apart from the outer circumference of the rotor core 100 and face the outer circumference of the rotor core 100, and may be configured such that a winding coil (not shown) is wound around the stator 300.

When the heat treatment portions 200 are formed side by side in the longitudinal direction of the plurality of conductor bars 140, the heat treatment portions 200 may be disposed between the plurality of conductor bars 140 and the inner circumference of the stator 300. Since the heat treatment portion 200 has relatively low magnetic permeability, magnetic flux leaking from the plurality of conductor bars 140 towards the outer circumference of the rotor core 100 is reduced. Therefore, in the case of driving the induction motor using the rotor core 100 for the induction motor according to an embodiment of the present disclosure, leakage flux is not large even though the plurality of slots 120 are configured in the closed type, so that a reduction in average torque does not occur.

Meanwhile, although not shown in the drawing, in order to obtain high starting torque, the plurality of slots 120 according to an embodiment of the present disclosure may include a plurality of first slots (not shown) and a plurality of second slots (not shown). Furthermore, in this case, the plurality of conductor bars 140 according to an embodiment of the present disclosure may include a plurality of first conductor bars (not shown) and a plurality of second conductor bars (not shown).

The plurality of first slots may be positioned relatively closed to the center of the rotor core 100, and the plurality of second slots may be spaced apart from the plurality of first slots to be relatively far from the center of the rotor core 100.

The plurality of first conductor bars may be coupled to the plurality of first slots, while the plurality of second conductor bars may be coupled to the plurality of second slots. In this case, the plurality of first conductor bars and the plurality of second conductor bars may be made of different materials.

Figure 4:
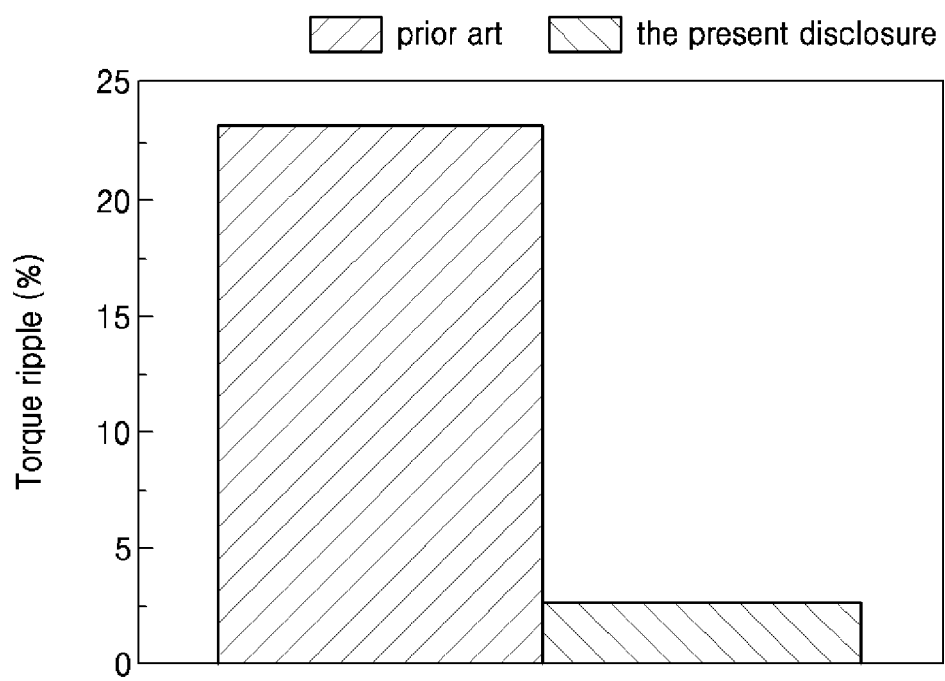
FIG. 4 is a diagram comparing the torque ripple of the induction motor using the rotor for the induction motor according to an embodiment of the present disclosure and the torque ripple of a conventional induction motor.

FIG. 4 is a diagram comparing the torque ripple of the induction motor using the rotor for the induction motor according to an embodiment of the present disclosure and the torque ripple of a conventional induction motor.

The torque ripple means a difference between the maximum torque and the minimum torque relative to the average torque in a steady state, expressed as a percentage. If the torque ripple is large, the vibration and noise caused by the driving of the induction motor increase. Thus, it is preferable to minimize the vibration and noise.

Referring to FIG. 4, a left bar graph means the torque ripple of the induction motor using the conventional rotor which is not thermally treated, while a right bar graph means the torque ripple of the induction motor having the heat treatment portion 200 as shown in FIG. 2A.

As shown in FIG. 4, it can be seen that the torque ripple of the induction motor having the heat treatment portion 200 according to an embodiment of the present disclosure is significantly smaller than the torque ripple of the conventional induction motor. The rotor for the induction motor according to an embodiment of the present disclosure can secure low torque ripple by applying heat treatment to the outer circumference of the rotor core 100 without a complicated coupling process between the plurality of slots 120 and the plurality of conductor bars 140.

As described above, the present disclosure is advantageous in that heat treatment is applied to the rotor manufactured by a simple process to reduce leakage flux and torque ripple while saving process cost and process time.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

The invention claimed is:

1. A rotor for an induction motor, the rotor comprising:
a rotor core having a hollow portion positioned on a central portion, wherein a shaft is coupled to the rotor core by being inserted through the hollow portion;
a plurality of slots radially formed on an inside of the rotor core around a central axis of the shaft;
a plurality of conductor bars coupled to the plurality of slots; and
an end ring electrically connecting the plurality of conductor bars to each other;
wherein the rotor core is thermally treated above Curie temperature to form a plurality of heat treatment portions each having a predetermined pattern on an outer circumference of the rotor core;
wherein the plurality of conductor bars have a skew structure in the rotor core;
wherein the plurality of slots and the plurality of conductor bars are not exposed when viewed radially from an outer circumferential surface of the rotor core;
wherein the predetermined pattern is formed side by side in a longitudinal direction of the plurality of conductor bars; and
wherein each of the plurality of heat treatment portions is in contact with each of the plurality of conductor bars.

2. The rotor of claim 1, wherein the plurality of conductor bars are disposed in a direction parallel to the shaft, and
the predetermined pattern is formed side by side in a longitudinal direction of the plurality of conductor bars.

3. The rotor of claim 1, wherein the predetermined pattern is formed side by side in a direction which is not parallel to the central axis of the shaft.

4. The rotor of claim 1, wherein the predetermined pattern is formed side by side in a shape of a 'V' or a 'U' to extend from a first end to a second end of the outer circumference of the rotor core.

5. The rotor of claim 2, wherein a width of the predetermined pattern varies in a longitudinal direction.

6. The rotor of claim 3, wherein a width of the predetermined pattern varies in a longitudinal direction.

7. The rotor of claim 4, wherein a width of the predetermined pattern varies in a longitudinal direction.

8. The rotor of claim 1, wherein a magnetic permeability of a portion on which the predetermined pattern is formed is 1/10 or less of that of a portion on which the predetermined pattern is not formed.

9. The rotor of claim 1, wherein the plurality of slots comprises:

a plurality of first slots; and
a plurality of second slots;
wherein the plurality of second slots are positioned farther from a center of the rotor core than the plurality of first slots; and
wherein the plurality of conductor bars comprises:
a plurality of first conductor bars coupled to the plurality of first slots; and
a plurality of second conductor bars coupled to the plurality of second slots.

10. An induction motor comprising:
a rotor comprising a rotor core having a hollow portion on a central portion, wherein a shaft is coupled to the rotor by being inserted through the hollow portion, a plurality of slots radially formed on an inside of the rotor core around a central axis of the shaft, a plurality of conductor bars coupled to the plurality of slots, and an end ring electrically connecting the plurality of conductor bars to each other;
a stator spaced apart from an outer circumference of the rotor core and facing a circumference of the rotor core; and
a winding coil wound around the stator;
wherein the rotor core is thermally treated above Curie temperature to form a plurality of heat treatment portions each having a predetermined pattern on the outer circumference of the rotor core;
wherein the conductor bars have a skew structure in the rotor core;
wherein the plurality of slots and the plurality of conductor bars are not exposed when viewed radially from an outer circumferential surface of the rotor core;
wherein the predetermined pattern is formed side by side in a longitudinal direction of the plurality of conductor bars; and
wherein each of the plurality of heat treatment portions is disposed be in contact with each of the plurality of conductor bars.

* * * * *